US008243160B2

(12) United States Patent
Azuma et al.

(10) Patent No.: US 8,243,160 B2
(45) Date of Patent: Aug. 14, 2012

(54) IMAGING PROCESSOR

(75) Inventors: Takeo Azuma, Kyoto (JP); Hiroyoshi Komobuchi, Kyoto (JP); Taro Imagawa, Osaka (JP)

(73) Assignee: Panasonic Corporation, Osaka (JP)

(*) Notice: Subject to any disclaimer, the term of this patent is extended or adjusted under 35 U.S.C. 154(b) by 162 days.

(21) Appl. No.: 12/914,273

(22) Filed: Oct. 28, 2010

(65) Prior Publication Data

US 2011/0043670 A1 Feb. 24, 2011

Related U.S. Application Data

(63) Continuation of application No. PCT/JP2010/000680, filed on Feb. 4, 2010.

(30) Foreign Application Priority Data

Feb. 5, 2009 (JP) .................................. 2009-025139

(51) Int. Cl.
*H04N 5/228* (2006.01)
*H04N 7/18* (2006.01)

(52) U.S. Cl. ................. 348/222.1; 348/154; 348/208.16; 382/299

(58) Field of Classification Search ............... 348/222.1, 348/208.13, 208.16
See application file for complete search history.

(56) References Cited

U.S. PATENT DOCUMENTS

| | | |
|---|---|---|
| 3,971,065 A | 7/1976 | Bayer |
| 5,523,786 A | 6/1996 | Parulski |
| 6,198,505 B1 | 3/2001 | Turner et al. |
| 6,646,146 B1 * | 11/2003 | Sinnema et al. .............. 554/160 |
| 6,827,268 B2 * | 12/2004 | Ishii et al. ................ 235/462.25 |
| 2005/0057687 A1 | 3/2005 | Irani et al. |

(Continued)

FOREIGN PATENT DOCUMENTS

EP 2 088 787 A1 8/2009

(Continued)

OTHER PUBLICATIONS

Keren et al., "Restoring subsampled color images", Machine Vision and Applications, 11, pp. 197-202, 1999 (Previously listed on IDS submitted with application on Oct. 28, 2010).

(Continued)

*Primary Examiner* — Hung Lam
(74) *Attorney, Agent, or Firm* — Renner, Otto, Boisselle & Sklar, LLP

(57) ABSTRACT

An imaging and processing device includes: an optical element; a single imager with a color filter array of a plurality of colors attached thereto for outputting a value according to an amount of light which has been guided by the optical element and transmitted through the color filter array, thereby enabling to obtain separate images of the plurality of colors for every frame time point; a first adder section for adding together values, associated with a first color of the plurality of colors, of different images obtained over a plurality of frame time points; a second adder section for adding together a plurality of values, associated with a second color of the plurality of colors other than the first color, of an image captured at a single frame time point; and an image restoring section for restoring an image including a plurality of colors at each frame time point from an image based on the first color which has been subjected to the addition by the first adder section, and an image based on the second color which has been subjected to the addition by the second adder section.

12 Claims, 10 Drawing Sheets

U.S. PATENT DOCUMENTS

| | | | |
|---|---|---|---|
| 2005/0111741 A1* | 5/2005 | Kim et al. | 382/232 |
| 2005/0219642 A1 | 10/2005 | Yachida et al. | |
| 2006/0119710 A1 | 6/2006 | Ben-Ezra et al. | |
| 2007/0032548 A1 | 2/2007 | Ellis | |
| 2007/0189386 A1 | 8/2007 | Imagawa et al. | |
| 2007/0211797 A1* | 9/2007 | Kim et al. | 375/240.12 |
| 2008/0317362 A1* | 12/2008 | Hosaki et al. | 382/233 |
| 2009/0123561 A1 | 5/2009 | Gewehr et al. | |
| 2009/0180020 A1 | 7/2009 | Nayar et al. | |
| 2009/0263044 A1 | 10/2009 | Imagawa et al. | |
| 2010/0013948 A1* | 1/2010 | Azuma et al. | 348/222.1 |
| 2010/0194911 A1* | 8/2010 | Motomura et al. | 348/222.1 |

FOREIGN PATENT DOCUMENTS

| | | |
|---|---|---|
| EP | 2 088 788 A1 | 8/2009 |
| JP | 06-315154 | 11/1994 |
| JP | 07-240931 | 9/1995 |
| JP | 3240339 | 10/2001 |
| JP | 4039858 | 11/2007 |
| JP | 2009-010823 | 1/2009 |
| WO | 99/60737 | 11/1999 |

OTHER PUBLICATIONS

Ron Kimmel, "Demosaicing: Imaging Reconstruction from Color CCD Samples", IEEE Transactions on Image Processing, vol. 8, No. 9, Sep. 1999 (Previously listed on IDS submitted with application on Oct. 28, 2010).

Alleysson et al., "Linear Demosaicing Inspired by the Human Visual System", IEEE Transactions on Image Processing, vol. 14, No. 4, Apr. 2005 (Previously listed on IDS submitted with application on Oct. 28, 2010).

P. Anandan, "Computational framework and an algorithm for the measurement of visual motion", International Journal of Computer Vision, vol. 2, pp. 283-310, 1989 (Previously listed on IDS submitted with application on Oct. 28, 2010).

International Search Report for corresponding International Application No. PCT/JP2010/000680 mailed May 11, 2010.

Keren et al., "Restoring subsampled color images", Machine Vision and Applications, 11, pp. 197-202, 1999.

Ron Kimmel, "Demosaicing: Imaging Reconstruction from Color CCD Samples", IEEE Transactions on Image Processing, vol. 8, No. 9, Sep. 1999.

Alleysson et al., "Linear Demosaicing Inspired by the Human Visual System", IEEE Transactions on Image Processing, vol. 14, No. 4, Apr. 2005.

P. Anandan, "Computational framework and an algorithm for the measurement of visual motion", International Journal of Computer Vision, vol. 2, pp. 283-310, 1989.

* cited by examiner

FIG.4A

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG.4B

|   |   |   |   |   |   |
|---|---|---|---|---|---|
|   | R |   |   |   | R |
|   |   | B |   |   |   |
|   |   |   |   |   |   |
|   |   |   |   |   |   |
|   | R |   |   |   | R |

TIME t

TIME t

*FIG.15*

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

IMAGING PROCESSOR

This is a continuation of International Application No. PCT/JP2010/000680, with an international filing date of Feb. 4, 2010, which claims priority of Japanese Patent Application No. 2009-025139, filed on Feb. 5, 2009, the contents of which are hereby incorporated by reference.

BACKGROUND OF THE INVENTION

1. Field of the Invention

The present invention relates to an image process for a video image. More particularly, the present invention relates to a technique for producing a video image obtained by increasing at least one of a resolution and a frame rate of a captured video image by an image process.

2. Description of the Related Art

U.S. Pat. No. 3,971,065 discloses a technique for recording a color image using a single imager. For example, FIG. 15 shows an example of a color filter array having an arrangement called a "Bayer arrangement" to be attached to a single imager of U.S. Pat. No. 3,971,065. In the figure, "R", "G" and "B" denote "red", "green" and "blue" filters, respectively (the same designation will be used hereinafter and in the drawings).

Light which has passed through the color filter of the Bayer arrangement shown in FIG. 15 is incident upon pixels of the imager. A signal output from each pixel of the imager has a value of a color of one of R, G and B.

As is clear from the description, each "pixel" of the imager is a unit portion of the imager that receives light having passed through a color filter of a color so as to output a signal according to the intensity of the received light.

On the other hand, when displaying an image captured as described above, there are needed values of R, G and B (or three colors of Y, Pb and Pr, etc.) for each pixel. In view of this, each of three following documents: Daniel Keren, Margarita Osadchy, "Restoring subsampled color images", Machine Vision and Applications, 11, pp. 197-202, 1999; Ron Kimmel, "Demosaicing: Image Reconstruction from Color CCD Samples", IEEE Transactions on Image Processing, Vol. 8, No. 9, September 1999; and David Alleysson, Sabine Susstrunk, "Linear Demosaicing Inspired by the Human Visual System", IEEE Transactions on Image Processing, Vol. 14, No. 4, April 2005, discloses a method for obtaining a color image with a large number of pixels by restoring, through arithmetic operations, pixel values of colors that have not been obtained for each pixel of the imager, thereby obtaining R, G and B pixel values for each pixel of the imager.

However, with conventional imaging and processing devices, the amount of light to be incident upon one pixel of the imager has decreased as the pixel size of the imager has been reduced for the purpose of increasing the resolution. As a result, this leads to a deterioration in the signal-to-noise ratio (S/N) of each pixel, thus making it difficult to maintain the image quality.

SUMMARY OF THE INVENTION

An object of the present invention is to provide an imaging and processing device capable of maintaining the image quality while suppressing a decrease in S/N of an imager.

An imaging and processing device of the present invention includes: an optical element; a single imager with a color filter array of a plurality of colors attached thereto for outputting a value according to an amount of light which has been guided by the optical element and transmitted through the color filter array, thereby enabling to obtain separate images of the plurality of colors for every frame time point; a first adder section for adding together values, associated with a first color of the plurality of colors, of different images obtained over a plurality of frame time points; a second adder section for adding together a plurality of values, associated with a second color of the plurality of colors other than the first color, of an image captured at a single frame time point; and an image restoring section for restoring an image including a plurality of colors at each frame time point from an image based on the first color which has been subjected to the addition by the first adder section, and an image based on the second color which has been subjected to the addition by the second adder section.

In one embodiment, the color filter array includes, as one of the plurality of colors, a third color which is different from the first color and the second color; the second adder section adds together a plurality of values, associated with the third color, of an image captured at the single frame time point; and the image restoring section includes: a motion detection section for detecting a motion from an image of the second color and an image of the third color which have been subjected to the addition by the second adder section so as to output motion information regarding the detected motion; and a restoring section for restoring an image including a plurality of colors at each frame time point based on the image of the first color, the image of the second color, the image of the third color, and the motion information detected by the motion detection section.

In one embodiment, the imaging and processing device further includes a control section for controlling an operation of the second adder section and an operation of the first adder section, wherein the control section controls the number of pixels to be added together by the second adder section and the first adder section according to one of: an amount of light or a pixel value received by the single imager; and according to a mode of operation specified by a user.

In one embodiment, the single imager is of a stacked type.

In one embodiment, the first color is green, and the second color and the third color are red and blue.

An imaging and processing device of the present invention includes: a single imager with a color filter array of red, green, blue and white attached thereto for outputting a value according to an amount of light which has been transmitted through the color filter array, thereby enabling to obtain an image for each color of the color filter array for every frame time point; a first adder section for adding together values associated with each of the images of red, green and blue obtained over a plurality of frame time points; a motion detection section for detecting a motion from the image of white so as to output motion information regarding the detected motion; and an image restoring section for restoring an image including red, green and blue at each frame time point based on the images of red, green and blue which have been subjected to the addition by the first adder section, the image of white, and the motion information.

An imaging and processing device of the present invention includes: a single imager with a color filter array of red, green, blue and white attached thereto for outputting a value according to an amount of light which has been transmitted through the color filter array, thereby enabling to obtain an image for each color of the color filter array for every frame time point; a first adder section for adding together values associated with each of the images of red, green and blue obtained over a plurality of frame time points; a second adder section for adding together a plurality of values associated with an image of white captured at a single frame time point; a motion detection section for detecting a motion from the image of white which has been subjected to the addition by the second adder section so as to output motion information regarding the detected motion; and an image restoring section for restoring an image including red, green and blue at each frame time point based on the images of red, green and blue which have been subjected to the addition by the first adder section, the image of white which has been subjected to the addition by the second adder section, and the motion information.

In one embodiment, the first adder section adds together values associated with each of the images of red, green and blue by setting an exposure time of the single imager to a length that spans a plurality of frame time points; and the first adder section changes the exposure time between red, green and blue.

A computer program of the present invention is a computer program to be executed by a computer provided in an imaging and processing device, the imaging and processing device including: an optical element; and a single imager with a color filter array of a plurality of colors attached thereto for outputting a value according to an amount of light which has been guided by the optical element and transmitted through the color filter array, thereby enabling to obtain separate images of the plurality of colors for every frame time point, the computer program causing the computer to execute the steps of: adding together values, associated with a first color of the plurality of colors, of different images obtained over a plurality of frame time points; adding together a plurality of values, associated with a second color of the plurality of colors other than the first color, of an image captured at a single frame time point; and restoring an image including a plurality of colors at each frame time point from an image based on the first color which has been subjected to the addition by the first addition step, and an image based on the second color which has been subjected to the addition by the second addition step.

With the imaging and processing device of the present invention, a single imager is provided with a temporal addition function and a spatial addition function, and a restoring process is performed on an input image which has been subjected to a temporal addition or a spatial addition for each pixel, whereby it is possible to estimate and restore an image with a high resolution and a high frame rate while ensuring a sufficient amount of light when recording the image.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 4A and 4B show virtual sampling positions when performing a 2×2-pixel spatial addition.

FIG. 15 is a diagram showing a conventional example of a color filter array having an arrangement known as a "Bayer arrangement" to be attached to a single imager.

DETAILED DESCRIPTION OF PREFERRED EMBODIMENTS

Embodiments of the imaging and processing device according to the present invention will now be described with reference to the accompanying drawings.

Embodiment 1

Figure 1:
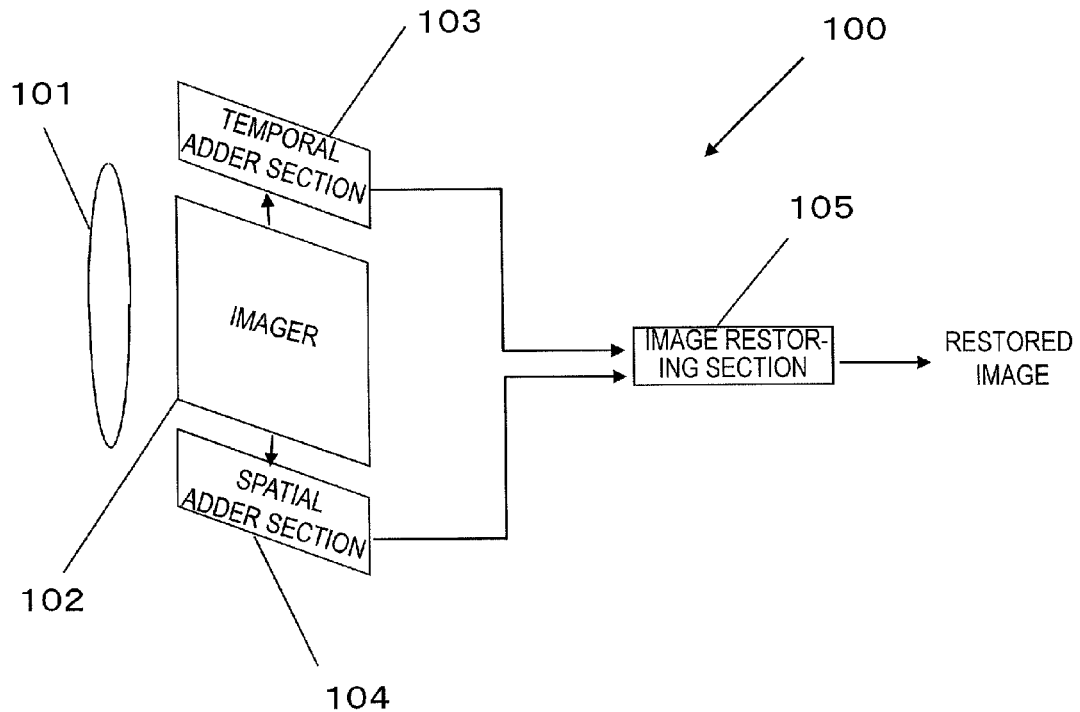
FIG. 1 is a block diagram showing a configuration of an imaging and processing device 100 according to Embodiment 1.

FIG. 1 is a block diagram showing a configuration of an imaging and processing device 100 of the present embodiment. In FIG. 1, the imaging and processing device 100 includes an optical system 101, a single color imager 102, two adder sections (i.e., a temporal adder section 103 being the first adder section, and a spatial adder section 104 being the second adder section), and an image restoring section 105. Each component of the imaging and processing device 100 will now be described in detail.

The optical system 101 forms an image of the subject on the image surface of the imager.

The single color imager 102 is a single imager with a color filter array attached thereto. The single color imager 102 photoelectrically converts the light (optical image) formed by the optical system 101 to output the obtained electric signal. Values of the electric signal are pixel values of the single color imager 102. A pixel value according to the amount of light that is incident upon each pixel is output from the single color imager 102. An image of a color is obtained by pixel values of the same color that have been captured at the same frame time point. A color image is obtained from images of all colors.

The temporal adder section 103 adds together, over a plurality of frames in the temporal direction, photoelectrically-converted values of the first color of the color image captured by the color imager 102. Herein, "addition in the temporal direction" refers to adding together pixel values of each pixel sharing the same pixel coordinate value across a plurality of consecutive frames (images). Specifically, the process adds together pixel values sharing the same pixel coordinate value across about two to nine frames.

The spatial adder section 104 adds together, over a plurality of pixels in the spatial direction, photoelectrically-converted values of the second color and the third color of the color image captured by the color imager 102. Herein, "addition in the spatial direction" refers to adding together pixel values of a plurality of pixels of one frame (image) captured at a certain point in time. Specifically, examples of "a plurality of pixels" of which pixel values are added together include two pixels (horizontal) by one pixel (vertical), one pixel (horizontal) by two pixels (vertical), two pixels (horizontal) by two pixels (vertical), two pixels (horizontal) by three pixels (vertical), three pixels (horizontal) by two pixels (vertical), three pixels (horizontal) by three pixels (vertical), etc. The pixel values (photoelectrically-converted values) of such a plurality of pixels are added together in the spatial direction.

The image restoring section 105 receives data of the first-color image which has been subjected to the temporal addition by the temporal adder section 103, and data of the second-color image and the third-color image which have been subjected to the spatial addition by the spatial adder section 104, and performs an image restoration on these data, thereby estimating values of the first to third colors of each pixel, and thus restoring a color image.

Figure 2:
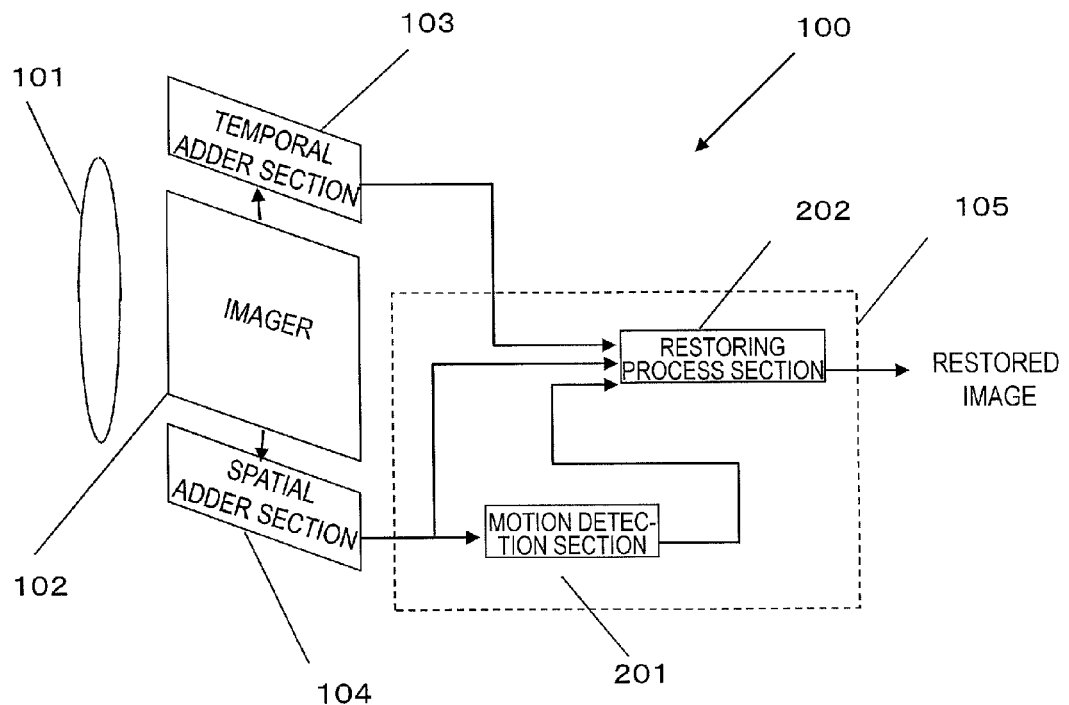
FIG. 2 is a configuration diagram showing an example of a more detailed configuration of an image restoring section 105.

FIG. 2 is a diagram showing an example of a more detailed configuration of the image restoring section 105. In FIG. 2, the configuration is the same as that of FIG. 1 except for the image restoring section 105. The image restoring section 105 includes a motion detection section 201 and a restoring process section 202.

The motion detection section 201 detects the motion (optical flow) from data of the second-color image and the third-color image which have been subjected to the spatial addition by a conventional technique such as the block matching, the gradient method and the phase correlation method. The motion detection section 201 outputs the information of the detected motion (motion information). For example, a known conventional technique is P. Anandan. "Computational framework and an algorithm for the measurement of visual motion", International Journal of Computer Vision, Vol. 2, pp. 283-310, 1989.

Figure 3A:
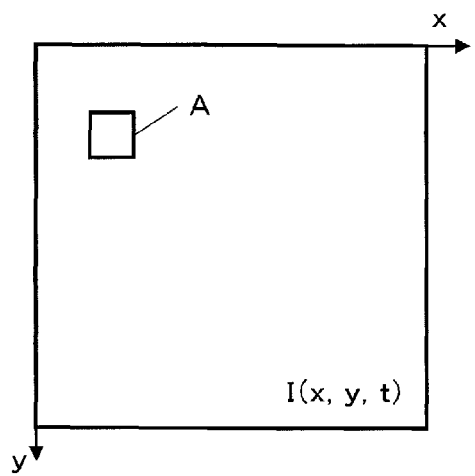
FIGS. 3A and 3B are diagrams showing a target frame and a reference frame, respectively, for performing a motion detection based on block matching. 3A is a diagram showing the image at time t, which is to be the target frame, and 3B is a diagram showing the image at time t+Δt, which is to be the reference frame.
Figure 3B:
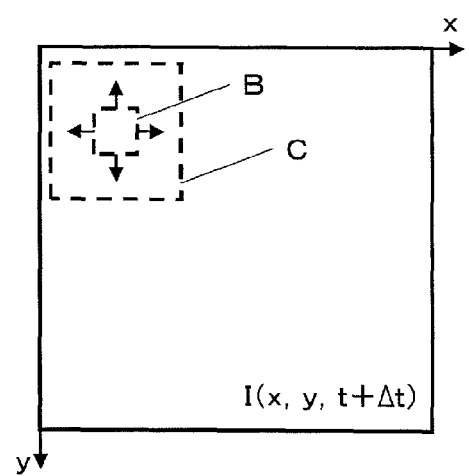

FIGS. 3A and 3B show a target frame and a reference frame when performing a motion detection by block matching. The motion detection section 201 sets a window area A shown in FIG. 3A in the target frame (an image at time t to which our attention is directed for obtaining the motion). Then, the process searches for a pattern in the reference frame that is similar to the pattern in the window area. For example, a frame following the target frame is often used as the reference frame.

As shown in FIG. 3B, the search range is typically a predetermined area (C in FIG. 3B) which is set based on the position B to which the amount of movement is zero. The level (degree) of similarity between the patterns is evaluated by calculating the sum of square differences (SSD) shown in Expression 1 or the sum of absolute differences (SAD) shown in Expression 2 as the evaluation value.

$$SSD = \sum_{x,y \in W} (f(x+u, y+v, t+\Delta t) - f(x, y, t))^2 \quad \text{[Expression 1]}$$

$$SAD = \sum_{x,y \in W} |f(x+u, y+v, t+\Delta t) - f(x, y, t)| \quad \text{[Expression 2]}$$

In Expression 1 and Expression 2, f(x,y,t) is a temporal/spatial distribution of the image, i.e., the pixel values, and x,y∈W means coordinate values of pixels included within the window area of the target frame.

The motion detection section 201 changes (u,v) within the search range so as to find a pair of (u,v) with which the evaluation value described above is smallest, and determines the pair as the motion vector between frames. By successively shifting the set position of the window area, the process determines the motion for each pixel or for each block (e.g., 8 pixels×8 pixels).

In the present invention, care should be taken with the step by which (u,v) is changed in the search range because the motion detection is performed on an image which has been subjected to a spatial addition for two of three colors of a single color imager with a color filter array attached thereto.

FIG. 4A shows virtual sampling positions when a 2×2-pixel spatial addition is performed. Herein, G is the first color, R the second color, and B the third color. Note that a simple designation such as "R", "G" and "B" may mean an image containing only that color component.

FIG. 4B shows virtual sampling positions when a 2×2-pixel spatial addition is performed for R and B of FIG. 4A. In this case, the virtual sampling positions are in an even arrangement for every 4 pixels for only R or B, but the sampling positions including both R and B at the same time are uneven. Therefore, (u,v) in Expression 1 or Expression 2 needs to be changed for every 4 pixels. Alternatively, (u,v) may be changed for every pixel after values of R and B of each pixel are obtained by a known interpolation method from the values of R and B at the virtual sampling positions shown in FIG. 4B.

A motion detection with sub-pixel precision is performed by fitting a linear or quadratic function to the distribution of values of (u,v) near (u,v) that minimizes Expression 1 or Expression 2 obtained as described above (a technique known in the art as an equiangular fitting method or a parabola fitting method).

<Restoring Pixel Value of G in Each Pixel>

The restoring process section 202 calculates the pixel value of G in each pixel by minimizing the following expression.

$$|Hf-g|^M + Q \quad \text{[Expression 3]}$$

In the expression, H is the sampling process, f is the G image to be restored having a high spatial resolution and a high temporal resolution, g is the G image captured by the imaging section 101, M is the exponent, and Q is a condition that should be satisfied by the image f to be restored, i.e., the constraint condition.

Here, f and g are column vectors whose elements are the pixel values of the video image. Hereinafter, the vector representation of an image means a column vector in which pixel values are arranged in the raster-scan order, and the function representation means a temporal/spatial distribution of pixel values. Where luminance values are used, a pixel value may be a single value per pixel. The number of elements of f is 2000×1000×30=60000000 where the video image to be restored has 2000 pixels in the horizontal direction, 1000 pixels in the vertical direction, and 30 frames, for example.

Where an image is captured by an imager of a Bayer arrangement as shown in FIGS. 4 and 15, the number of elements of g is ½ that of f, i.e., 30000000. The number of pixels in the vertical direction, the number of pixels in the horizontal direction, and the number of frames used in signal processing of f are set by the image restoring section 105. The sampling process H samples f. H is a matrix of which the number of rows is equal to the number of elements of g and the number of columns is equal to the number of elements of f.

Computers commonly used at present are not capable of obtaining, in a single process, f that minimizes Expression 2, because of the excessive amount of information for the number of pixels (e.g., 2000 pixels in width direction×1000 pixels in height direction) and the number of frames (e.g., 30 frames) of a video image. In such a case, the video image f to be restored can be calculated by repeating a process of obtaining a part of f for a temporally/spatially partial area.

Next, formulation of the sampling process H will be described by way of a simple example. Consider a recording process for G in a case where an image having 2 pixels in width direction (x=1,2), 2 pixels in height direction (y=1,2), and 2 frames (t=1,2) is captured by an imager of a Bayer arrangement, and the temporal addition is performed for G over 2 frames.

$$f = (G_{111}\ G_{211}\ G_{121}\ G_{221}\ G_{112}\ G_{212}\ G_{122}\ G_{222})^T \quad \text{[Expression 4]}$$

$$H = \begin{pmatrix} 0 & 1 & 0 & 0 & 0 & 1 & 0 & 0 \\ 0 & 0 & 1 & 0 & 0 & 0 & 1 & 0 \end{pmatrix} \quad \text{[Expression 5]}$$

Thus, the sampling process H is formulated as follows.

$$g = Hf = \begin{pmatrix} 0 & 1 & 0 & 0 & 0 & 1 & 0 & 0 \\ 0 & 0 & 1 & 0 & 0 & 0 & 1 & 0 \end{pmatrix} \quad \text{[Expression 6]}$$

$$(G_{111}\ G_{211}\ G_{121}\ G_{221}\ G_{112}\ G_{212}\ G_{122}\ G_{222})^T$$

$$= (G_{211} + G_{212}\ G_{121} + G_{122})^T$$

In Expression 4, $G_{111}$ to $G_{222}$ each denote a G value of a pixel, with the three indices representing x, y and t values. Since g is an image obtained by recording the image with an imager of a Bayer arrangement, the number of pixels thereof is ½ an image of which all pixels are read out.

Although the value of the exponent M of Expression 3 is not limited to any particular value, it is preferably 1 or 2 in terms of the computational load.

Expression 6 shows the process of obtaining g by recording f with an imager of a Bayer arrangement. On the other hand, the problem of restoring f from g is what is generally referred to as an inverse problem. In the absence of the constraint condition Q, there are an infinite number of f's that minimize Expression 7 below.

$$|Hf - g|^M \quad \text{[Expression 7]}$$

This can easily be explained because Expression 7 holds true with any values used to fill the non-sampled pixel values. Thus, f cannot be solved uniquely by minimizing Expression 7.

In order to obtain a unique solution for f, there is introduced, as Q, a smoothness constraint on the distribution of pixel values f, or a smoothness constraint on the distribution of the motion of the image obtained from f.

The following constraint expressions are used as smoothness constraints on the distribution of pixel values f.

$$Q = \left|\frac{\partial f}{\partial x}\right|^m + \left|\frac{\partial f}{\partial y}\right|^m \quad \text{[Expression 8]}$$

$$Q = \left|\frac{\partial^2 f}{\partial x^2}\right|^m + \left|\frac{\partial^2 f}{\partial y^2}\right|^m \quad \text{[Expression 9]}$$

In the expressions, $\partial f/\partial x$ is a column vector whose elements are first-order differentiation values in the x direction of pixel values of the video image to be restored, $\partial f/\partial y$ is a column vector whose elements are first-order differentiation values in the y direction of pixels values of the video image to be restored, $\partial^2 f/\partial x^2$ is a column vector whose elements are second-order differentiation values in the x direction of pixel values of the video image to be restored, and $\partial^2 f/\partial y^2$ is a column vector whose elements are second-order differentiation values in the y direction of pixel values of the video image to be restored. Moreover, ∥ represents the norm of a vector. The value of the exponent m is preferably 1 or 2, as is the exponent M in Expression 2 or Expression 7.

Note that the above partial differentiation values $\partial f/\partial x$, $\partial f/\partial y$, and $\partial^2 f/\partial y^2$ can be approximately calculated by Expression 10, for example, through difference expansion using pixel values from around the target pixel.

$$\frac{\partial f(x, y, t)}{\partial x} = \frac{f(x+1, y, t) - f(x-1, y, t)}{2} \quad \text{[Expression 10]}$$

$$\frac{\partial f(x, y, t)}{\partial y} = \frac{f(x, y+1, t) - f(x, y-1, t)}{2}$$

$$\frac{\partial^2 f(x, y, t)}{\partial x^2} = f(x+1, y, t) - 2f(x, y, t) + f(x-1, y, t)$$

$$\frac{\partial^2 f(x, y, t)}{\partial y^2} = f(x, y+1, t) - 2f(x, y, t) + f(x, y-1, t)$$

The difference expansion is not limited to Expression 10 above, and other nearby pixels may be referenced as shown in Expression 11, for example.

[Expression 11]

$$\frac{\partial f(x, y, t)}{\partial x} = \frac{1}{6}(f(x+1, y-1, t) - f(x-1, y-1, t) + f(x+1, y, t) - f(x-1, y, t) + f(x+1, y+1, t) - f(x-1, y+1, t))$$

$$\frac{\partial f(x, y, t)}{\partial y} = \frac{1}{6}(f(x-1, y+1, t) - f(x-1, y-1, t) + f(x, y+1, t) - f(x, y-1, t) + f(x+1, y+1, t) - f(x+1, y-1, t))$$

$$\frac{\partial^2 f(x, y, t)}{\partial x^2} = \frac{1}{3}(f(x+1, y-1, t) - 2f(x, y-1, t) + f(x-1, y-1, t) + f(x+1, y, t) - 2f(x, y, t) + f(x-1, y, t) + f(x+1, y+1, t) - 2f(x, y+1, t) + f(x-1, y+1, t))$$

$$\frac{\partial^2 f(x, y, t)}{\partial y^2} = \frac{1}{3}(f(x-1, y+1, t) - 2f(x, y, t) + f(x, y-1, t) + f(x+1, y+1, t) - 2f(x+1, y, t) + f(x+1, y-1, t))$$

Expression 11 obtains an average using values of a larger number of the peripheral pixels, as compared with the calculation value by Expression 10. This results in a lower spatial resolution, but is less susceptible to noise influence. Moreover, as something in-between, the following expression may be employed while weighting a within the range of $0 \leq \alpha \leq 1$.

[Expression 12]
$$\frac{\partial f(x, y, t)}{\partial x} = \frac{1-\alpha}{2} \frac{f(x+1, y-1, t) - f(x-1, y-1, t)}{2} +$$
$$\alpha \frac{f(x+1, y, t) - f(x-1, y, t)}{2} +$$
$$\frac{1-\alpha}{2} \frac{f(x+1, y+1, t) - f(x-1, y+1, t)}{2}$$

$$\frac{\partial f(x, y, t)}{\partial y} = \frac{1-\alpha}{2} f(x-1, y+1, t) - f(x-1, y-1, t) +$$
$$\alpha \frac{f(x, y+1, t) - f(x, y-1, t)}{2} +$$
$$\frac{1-\alpha}{2} \frac{f(x+1, y+1, t) - f(x+1, y-1, t)}{2}$$

$$\frac{\partial^2 f(x, y, t)}{\partial x^2} =$$
$$\frac{1-\alpha}{2}(f(x+1, y-1, t) - 2f(x, y-1, t) + f(x-1, y-1, t)) +$$
$$\alpha(f(x+1, y, t) - 2f(x, y, t) + f(x-1, y, t)) +$$
$$\frac{1-\alpha}{2}(f(x+1, y+1, t) - 2f(x, y+1, t) + f(x-1, y+1, t))$$

$$\frac{\partial^2 f(x, y, t)}{\partial y^2} =$$
$$\frac{1-\alpha}{2}(f(x-1, y+1, t) - 2f(x-1, y, t) + f(x-1, y-1, t)) +$$
$$\alpha(f(x, y+1, t) - 2f(x, y, t) + f(x, y-1, t)) +$$
$$\frac{1-\alpha}{2}(f(x+1, y+1, t) - 2f(x+1, y, t) + f(x+1, y-1, t))$$

Regarding how the difference expansion is calculated, $\alpha$ may be predetermined according to the noise level so as to better improve the image quality as a result of the process, or Expression 10 may be used so that the circuit scale or the computational load is kept as small as possible.

Note that the smoothness constraint on the distribution of pixel values of the image f is not limited to Expression 8 or Expression 9, but may be $m^{th}$ power of the absolute value of the second-order direction differentiation as shown in Expression 13.

[Expression 13]
$$Q = \left|\frac{\partial}{\partial n_{min}}\left(\frac{\partial f}{\partial n_{min}}\right)\right|^m = \left|\frac{\partial}{\partial n_{min}}\left(-\sin\theta\frac{\partial f}{\partial x} + \cos\theta\frac{\partial f}{\partial y}\right)\right|^m$$
$$= \left|-\sin\theta\frac{\partial}{\partial x}\left(-\sin\theta\frac{\partial f}{\partial x} + \cos\theta\frac{\partial f}{\partial y}\right) + \cos\theta\frac{\partial}{\partial y}\left(-\sin\theta\frac{\partial f}{\partial x} + \cos\theta\frac{\partial f}{\partial y}\right)\right|^m$$
$$= \left|\sin^2\theta\frac{\partial^2 f}{\partial x^2} - \sin\theta\cos\theta\frac{\partial^2 f}{\partial x \partial y} - \sin\theta\cos\theta\frac{\partial^2 f}{\partial y \partial x} + \cos^2\theta\frac{\partial^2 f}{\partial y^2}\right|^m$$

In the expression, the vector $n_{min}$ and the angle $\theta$ represent the direction in which the square of the first-order direction differentiation is minimized, and are given by Expression 14 below.

[Expression 14]
$$n_{min} = \left(\frac{-\frac{\partial f}{\partial y}}{\sqrt{\left(\frac{\partial f}{\partial x}\right)^2 + \left(\frac{\partial f}{\partial y}\right)^2}} \quad \frac{\frac{\partial f}{\partial y}}{\sqrt{\left(\frac{\partial f}{\partial x}\right)^2 + \left(\frac{\partial f}{\partial y}\right)^2}}\right)^T$$
$$= (-\sin\theta \quad \cos\theta)^T$$

Moreover, as the smoothness constraint on the distribution of pixel values of the image f, the constraint condition may be changed adaptively according to the gradient of the pixel values of f by using any of Q's of Expression 15 to Expression 17 below.

[Expression 15]
$$Q = w(x, y)\left|\left(\frac{\partial f}{\partial x}\right)^2 + \left(\frac{\partial f}{\partial y}\right)^2\right|$$

[Expression 16]
$$Q = w(x, y)\left|\left(\frac{\partial^2 f}{\partial x^2}\right)^2 + \left(\frac{\partial^2 f}{\partial y^2}\right)^2\right|$$

[Expression 17]
$$Q = w(x, y)\left|\frac{\partial}{\partial n_{min}}\left(\frac{\partial f}{\partial n_{min}}\right)\right|^m$$

In Expression 15 to Expression 17, w(x,y) is a function of the gradient of pixel values, and is a weighting function for the constraint condition. For example, the constraint condition can be changed adaptively according to the gradient of f by making the value of w(x,y) smaller when the power sum of the gradient component of pixel values shown in Expression 18 below is larger, and vice versa.

[Expression 18]
$$\left|\frac{\partial f}{\partial x}\right|^m + \left|\frac{\partial f}{\partial y}\right|^m$$

By introducing such a weighting function, it is possible to prevent the image f to be restored from being smoothed more than necessary.

The weighting function w(x,y) may be defined based on how large or small the exponentiation of the direction differentiation shown in Expression 19 is, instead of the sum of squares of the luminance gradient component shown in Expression 18.

[Expression 19]
$$\left|\frac{\partial f}{\partial n_{max}}\right|^m = \left|\cos\theta\frac{\partial f}{\partial x} + \sin\theta\frac{\partial f}{\partial y}\right|^m$$

In the expression, the vector $n_{max}$ and the angle $\theta$ represent the direction in which the direction differentiation is maximized, and are given by Expression 20 below.

[Expression 20]
$$n_{max} = \left(\frac{\frac{\partial f}{\partial x}}{\sqrt{\left(\frac{\partial f}{\partial x}\right)^2 + \left(\frac{\partial f}{\partial y}\right)^2}} \quad \frac{\frac{\partial f}{\partial y}}{\sqrt{\left(\frac{\partial f}{\partial x}\right)^2 + \left(\frac{\partial f}{\partial y}\right)^2}}\right)^T =$$
$$(\cos\theta \quad \sin\theta)^T$$

A problem of solving Expression 2 by introducing the smoothness constraint on the distribution of pixel values of the video image f, as shown in Expression 8, Expression 9 and Expression 13 to Expression 17, can be calculated by a known solution (solution to a variational problem such as a finite element method).

The smoothness constraint on the image's motion distribution included in f may be Expression 21 or Expression 22 below.

$$Q = \left|\frac{\partial u}{\partial x}\right|^m + \left|\frac{\partial u}{\partial y}\right|^m + \left|\frac{\partial v}{\partial x}\right|^m + \left|\frac{\partial v}{\partial y}\right|^m \quad \text{[Expression 21]}$$

$$Q = \left|\frac{\partial^2 u}{\partial x^2}\right|^m + \left|\frac{\partial^2 u}{\partial y^2}\right|^m + \left|\frac{\partial^2 v}{\partial x^2}\right|^m + \left|\frac{\partial^2 v}{\partial y^2}\right|^m \quad \text{[Expression 22]}$$

In the expression, u is a column vector whose element is the x direction component of the motion vector for each pixel obtained from the video image f, and v is a column vector whose element is the y direction component of the motion vector for each pixel obtained from the video image f.

The smoothness constraint on the image's motion distribution obtained from f is not limited to Expression 17 and Expression 18, and may be the first-order or second-order direction differentiation shown in Expression 23 and Expression 24, for example.

$$Q = \left|\frac{\partial u}{\partial n_{min}}\right|^m + \left|\frac{\partial v}{\partial n_{min}}\right|^m \quad \text{[Expression 23]}$$

$$Q = \left|\frac{\partial}{\partial n_{min}}\left(\frac{\partial u}{\partial n_{min}}\right)\right|^m + \left|\frac{\partial}{\partial n_{min}}\left(\frac{\partial v}{\partial n_{min}}\right)\right|^m \quad \text{[Expression 24]}$$

Moreover, the constraint condition of Expression 17 to Expression 20 may be changed adaptively according to the gradient of pixel values of f, as shown in Expression 25 to Expression 28.

$$Q = w(x, y)\left(\left|\frac{\partial u}{\partial x}\right|^m + \left|\frac{\partial u}{\partial y}\right|^m + \left|\frac{\partial v}{\partial x}\right|^m + \left|\frac{\partial v}{\partial y}\right|^m\right) \quad \text{[Expression 25]}$$

$$Q = w(x, y)\left(\left|\frac{\partial^2 u}{\partial x^2}\right|^m + \left|\frac{\partial^2 u}{\partial y^2}\right|^m + \left|\frac{\partial^2 v}{\partial x^2}\right|^m + \left|\frac{\partial^2 v}{\partial y^2}\right|^m\right) \quad \text{[Expression 26]}$$

$$Q = w(x, y)\left(\left|\frac{\partial u}{\partial n_{min}}\right|^m + \left|\frac{\partial v}{\partial n_{min}}\right|^m\right) \quad \text{[Expression 27]}$$

$$Q = w(x, y)\left(\left|\frac{\partial}{\partial n_{min}}\left(\frac{\partial u}{\partial n_{min}}\right)\right|^m + \left|\frac{\partial}{\partial n_{min}}\left(\frac{\partial v}{\partial n_{min}}\right)\right|^m\right) \quad \text{[Expression 28]}$$

In the expression, w(x,y) is the same as that of the weighting function for the gradient of pixel values of f, and is defined by the power sum of the gradient component of pixel values shown in Expression 18, or the exponentiation of the direction differentiation shown in Expression 19.

By introducing such a weighting function, it is possible to prevent the motion information of f from being smoothed more than necessary, and it is possible as a result to prevent the image f to be restored from being smoothed more than necessary.

With the problem of solving Expression 2 by introducing the smoothness constraint on the motion distribution obtained from the image f as shown in Expression to Expression 28, the image f to be restored and the motion information (u,v) are dependent on each other, and it therefore requires a complicated calculation as compared with a case where the smoothness constraint on f is used.

This can be calculated by a known solution (a solution to a variational problem using an EM algorithm, or the like). Then, the repetitive calculation requires initial values of the image f to be restored and the motion information (u,v). The initial value of f may be an image subject to an interpolation based expansion of the input image.

On the other hand, the motion information may be one that is obtained by calculating Expression 1 or Expression 2 by means of the motion detection section 201. As a result, it is possible to improve the image quality as a result of the super-resolution process by solving Expression 2, by means of the restoring process section 202, by introducing the smoothness constraint on the motion distribution obtained from the image f as shown in Expression 21 to Expression 28 as described above.

The process performed by the restoring process section 202 may use, at the same time as shown in Expression 29, one of the smoothness constraints on the distribution of pixel values shown in Expression 8, Expression 9 and Expression 13 to Expression 17, combined with one of the smoothness constraints on the motion distribution shown in Expression 21 to Expression 28.

$$Q = \lambda_1 Q_f + \lambda_2 Q_{uv} \quad \text{[Expression 29]}$$

In the expression, Qf is the smoothness constraint on the gradient of pixel values of f, Quv is the smoothness constraint on the image's motion distribution obtained from f, and λ1 and λ2 are weights on the constraints of Qf and Quv.

The problem of solving Expression 3 by introducing both the smoothness constraint on the distribution of pixel values and the smoothness constraint on the image's motion distribution can also be calculated by a known solution (a solution to a variational problem using an EM algorithm, or the like).

The constraint on the motion is not limited to those on the smoothness of distribution of motion vectors shown in Expression 21 to Expression 28, and the residual between corresponding points (the difference in pixel value between the start point and the end point of the motion vector), as the evaluation value, may be decreased. The residual between corresponding points may be expressed as follows, where f is represented as the function f(x,y,t).

$$f(x+u, y+v, t+\Delta t) - f(x,y,t) \quad \text{[Expression 30]}$$

Taking the entire image into consideration while assuming f as a vector, the residual at each pixel can be represented as a vector as shown in Expression 31 below.

$$H_m f \quad \text{[Expression 31]}$$

The residual sum of squares can be represented as shown in Expression 32 below.

$$(H_m f)^2 = f^T H_m^T H_m f \quad \text{[Expression 32]}$$

In Expression 31 and Expression 32, $H_m$ is a matrix whose number of elements is equal to the number of elements of the vector f (the total number of pixels in time and space)×f. In each row of $H_m$, only elements corresponding to the start point and the end point of the motion vector have non-zero values, with the other elements having a value of zero. Where the motion vector has an integer precision, elements corresponding to the start point and the end point have values of −1 and 1, respectively, with the other elements being zero.

Where the motion vector has a sub-pixel precision, a plurality of elements corresponding to a plurality of pixels around the end point will have values according to values of sub-pixel components of the motion vector.

The constraint condition may be as shown in Expression 33, where Expression 32 is denoted as Qm.

$$Q = \lambda_1 Q_f + \lambda_2 Q_{uv} + \lambda_3 Q_m \quad \text{[Expression 33]}$$

In the expression, λ3 is the weight on the constraint condition Qm.

By using motion information extracted from R and B low-resolution video images by a method described above, it is possible to increase the temporal/spatial resolution of a video image (an image obtained by exposure over a plurality of frames) of G captured by an imager of a Bayer arrangement.

<Restoring Pixel Value of R and B in Each Pixel>

Figure 5:
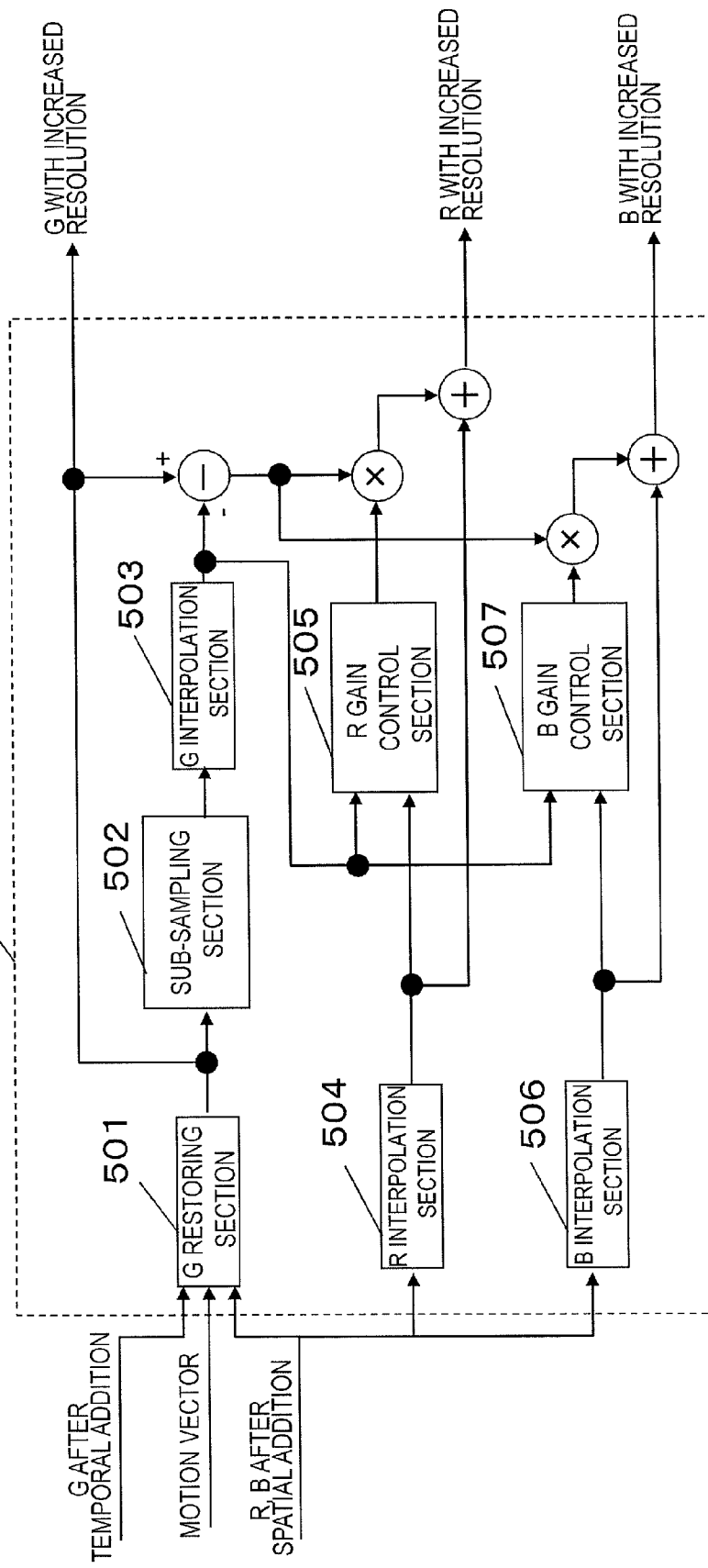
FIG. 5 is a diagram showing an example of a configuration of a restoring process section 202.

Regarding R and B, it is possible to output color images obtained by increasing the resolution through a simple process by superimposing high-frequency components of G whose temporal/spatial resolution has been increased upon interpolated enlarged R and B images, as shown in FIG. 5. It is possible to perform a resolution-increasing process with natural appearance while suppressing occurrence of false colors by controlling the amplitude of the high-frequency components to be superimposed according to the local correlation between R, G and B in a range other than the high-frequency range (in the mid-to-low frequency range).

Also for R and B, the high-frequency range of G is superimposed to increase the resolution thereof, and it is therefore possible to realize a more stable resolution-increasing process.

FIG. 5 shows an example of a configuration of the restoring process section 202 which performs the operation described above. The restoring process section 202 includes a G restoring section 501, a sub-sampling section 502, a G interpolation section 503, an R interpolation section 504, an R gain control section 505, a B interpolation section 506, and a B gain control section 507.

The G restoring section 501 performs the G restoring process described above.

The sub-sampling section 502 decimates the resolution-increased G to the same number of pixels as those of R and B.

The G interpolation section 503 calculates, through interpolation, pixel values of pixels where pixel values have been lost by sub-sampling.

The R interpolation section 504 interpolates R.

The R gain control section 505 calculates the gain coefficient for the high-frequency component of G to be superimposed upon R.

The B interpolation section 506 interpolates B.

The B gain control section 507 calculates the gain coefficient for the high-frequency component of G to be superimposed upon B.

The operation of the restoring process section 202 described above will now be described.

The G restoring section 501 restores G as a high-resolution, high-frame rate image. The G restoring section 501 outputs the restoration result as the G component of the output image. The G component is input to the sub-sampling section 502. The sub-sampling section 502 decimates (sub-samples) the input G component.

The G interpolation section 503 interpolates the G image which has been decimated by the sub-sampling section 502. Thus, pixel values of pixels where pixel values have been lost by sub-sampling are calculated by interpolation using surrounding pixel values. The G image thus interpolated is subtracted from the output of the G restoring section 501, thus extracting the high-spatial frequency component of G.

On the other hand, the R interpolation section 504 interpolates and enlarges the R image which has been subjected to a spatial addition so that the number of pixels thereof is equal to that of G. The R gain control section 505 calculates the local correlation coefficient between the output of the G interpolation section 503 (i.e., the low-spatial frequency component of G) and the output of the R interpolation section 504. A correlation coefficient for the 3×3 pixels around the target pixel (x,y) is calculated, as the local correlation coefficient, by Expression 34, for example.

$$\rho = \frac{\sum_{i=-1,0,1}^{3} \sum_{j=-1,0,1}^{3} (R(x+i, y+j) - \overline{R})(G(x+i, y+j) - \overline{G})}{\sqrt{\sum_{i=-1,0,1}^{3} \sum_{j=-1,0,1}^{3} (R(x+i, y+j) - \overline{R})^2} \sqrt{\sum_{i=-1,0,1}^{3} \sum_{j=-1,0,1}^{3} (G(x+i, y+j) - \overline{G})^2}} \quad \text{[Expression 34]}$$

where $$\overline{R} = \frac{1}{9} \sum_{i=-1,0,1}^{3} \sum_{j=-1,0,1}^{3} R(x+i, y+j)$$

$$\overline{G} = \frac{1}{9} \sum_{i=-1,0,1}^{3} \sum_{j=-1,0,1}^{3} G(x+i, y+j)$$

After the high-spatial frequency component of G is multiplied by the correlation coefficient for the low-spatial frequency components of R and G calculated as described above, the result is added to the output of the R interpolation section 504, thereby increasing the resolution of the R component.

The B component is processed similarly to the R component. That is, the B interpolation section 506 interpolates and enlarges the B image which has been subjected to a spatial addition so that the number of pixels thereof is equal to that of G. The B gain control section 507 calculates the local correlation coefficient between the output of the G interpolation section 503 (i.e., the low-spatial frequency component of G) and the output of the B interpolation section 506. A correlation coefficient for the 3×3 pixels around the target pixel (x,y) is calculated, as the local correlation coefficient, by Expression 35, for example.

$$\rho = \frac{\sum_{i=-1,0,1}^{3} \sum_{j=-1,0,1}^{3} (B(x+i, y+j) - \overline{B})(G(x+i, y+j) - \overline{G})}{\sqrt{\sum_{i=-1,0,1}^{3} \sum_{j=-1,0,1}^{3} (B(x+i, y+j) - \overline{B})^2} \sqrt{\sum_{i=-1,0,1}^{3} \sum_{j=-1,0,1}^{3} (G(x+i, y+j) - \overline{G})^2}} \quad \text{[Expression 35]}$$

where $$\overline{B} = \frac{1}{9} \sum_{i=-1,0,1}^{3} \sum_{j=-1,0,1}^{3} B(x+i, y+j)$$

$$\overline{G} = \frac{1}{9} \sum_{i=-1,0,1}^{3} \sum_{j=-1,0,1}^{3} G(x+i, y+j)$$

After the high-spatial frequency component of G is multiplied by the correlation coefficient for the low-spatial frequency components of B and G calculated as described above, the result is added to the output of the B interpolation section 506, thereby increasing the resolution of the B component.

Note that the method of calculating the pixel values of G, R and B at the restoring section 202 described above is merely an example, and another calculation method may be employed. For example, the pixel values of R, G and B may be calculated simultaneously at the restoring section 202.

That is, an evaluation function J is set, representing the degree of closeness between spatial change patterns of images of different colors of a target color image g, and the restoring section 202 obtains a target image g that minimizes the evaluation function J. The spatial change patterns being close to one another means that the spatial changes of the blue image, the red image and the green image are similar to one another. An example of the evaluation function J is shown in Expression 36.

[Expression 36]

$$J(g) = \\ \|H_R R_H - R_L\|^2 + \|H_G G_H - G_L\|^2 + \|H_B B_H - B_L\|^2 + \\ \lambda_\theta \|Q_S C_\theta g\|^p + \lambda_\phi \|Q_S C_\phi g\|^p + \lambda_r \|Q_S C_r g\|^p$$

The evaluation function J is defined as a function of the red, green and blue images (designated as image vectors $R_H$, $G_H$ and $B_H$) which together form a high-resolution color image (target image) g to be produced. In Expression 36, $H_R$, $H_G$ and $H_B$ represent resolution-lowering conversions from the images $R_H$, $G_H$ and $B_H$ of different colors of the target image g to input images $R_L$, $G_L$ and $B_L$ of different colors (vector representation). For example, $H_R$, $H_G$ and $H_B$ are resolution-lowering conversions as shown in Expression 37, Expression 38 and Expression 39, respectively.

[Expression 37]

$$R_L(x_{RL}, y_{RL}) = \sum_{(x',y')\in C} w_R(x', y') \cdot R_H(x(x_{RL}) + x', y(y_{RL}) + y')$$

[Expression 38]

$$G_L(x_{GL}, y_{GL}) = \sum_{(x',y')\in C} w_G(x', y') \cdot G_H(x(x_{GL}) + x', y(y_{GL}) + y')$$

[Expression 39]

$$B_L(x_{BL}, y_{BL}) = \sum_{(x',y')\in C} w_B(x', y') \cdot B_H(x(x_{BL}) + x', y(y_{BL}) + y')$$

A pixel value of an input image is the weighted sum of pixel values from a local area centered about a corresponding position in the target image.

In Expression 37, Expression 38 and Expression 39, $R_H(x,y)$, $G_H(x,y)$ and $B_H(x,y)$ represent the red (R) pixel value, the green (G) pixel value and the blue (B) pixel value, respectively, at the pixel position (x,y) of the target image g. $R_L(x_{RL}, y_{RL})$, $G_L(x_{GL}, y_{GL})$ and $B_L(x_{BL}, y_{BL})$ represent the pixel value at the pixel position $(x_{RL}, y_{RL})$ of the red input image, the pixel value at the pixel position $(x_{GL}, y_{GL})$ of the green input image, and the pixel value at the pixel position $(x_{BL}, y_{BL})$ of the blue input image, respectively. Moreover, $x(x_{RL}), y(y_{RL})$, $x(x_{GL}), y(y_{GL})$ and $x(x_{BL}), y(y_{BL})$ represent the x, y coordinates of the pixel position on the target image corresponding to the pixel position $(x_{RL}, y_{RL})$ on the red image of the input image, the x, y coordinates of the pixel position on the target image corresponding to the pixel position $(x_{GL}, y_{GL})$ on the green image of the input image, and the x, y coordinates of the pixel position on the target image corresponding to the pixel position $(x_{BL}, y_{BL})$ on the blue image of the input image, respectively. Moreover, $w_R$, $w_G$ and $w_B$ represent weighting functions of pixel values of the target image with respect to the pixel values of the input images of the red image, the green image and the blue image, respectively. Note that $(x',y')\in C$ represents the range of the local area where $w_R$, $w_G$ and $w_B$ are defined.

The sum of squares of the difference between pixel values of the resolution-lowered image and the input image at a corresponding pixel position is set as an evaluation condition of the evaluation function (the first, second and third terms of Expression 30). That is, these evaluation conditions are set by values representing the magnitude of the difference vector between a vector whose elements are pixel values included in the resolution-lowered image and a vector whose elements are pixel values included in the input image.

In Expression 36, $Q_s$ in the fourth term is an evaluation condition for evaluating the spatial smoothness of pixel values.

Expression 40 and Expression 41 show $Q_{s1}$ and $Q_{s2}$, respectively, which are examples of $Q_s$.

[Expression 40]

$$Q_{s1} = \sum_x \sum_y \begin{bmatrix} \lambda_\theta(x,y) \cdot \{4 \cdot \theta_H(x,y) - \theta_H(x,y-1) - \theta_H(x,y+1) - \theta_H(x-1,y) - \theta_H(x+1,y)\}^2 + \\ \lambda_\varphi(x,y) \cdot \{4 \cdot \varphi_H(x,y) - \varphi_H(x,y-1) - \varphi_H(x,y+1) - \varphi_H(x-1,y) - \varphi_H(x+1,y)\}^2 + \\ \lambda_r(x,y) \cdot \{4 \cdot r_H(x,y) - r_H(x,y-1) - r_H(x,y+1) - r_H(x-1,y) - r_H(x+1,y)\}^2 \end{bmatrix}$$

In Expression 40, $\theta_H(x,y)$, $\psi_H(x,y)$ and $r_H(x,y)$ are coordinate values representing, in the spherical coordinate system $(\theta,\psi,r)$ corresponding to the RGB color space, positions in a three-dimensional orthogonal color space (a so-called "RGB color space") represented by the red, green and blue pixel values at the pixel position (x,y) on the target image. Herein, $\theta_H(x,y)$ and $\psi_H(x,y)$ represent two different arguments, and $r_H(x,y)$ represents the radius vector.

Figure 6:
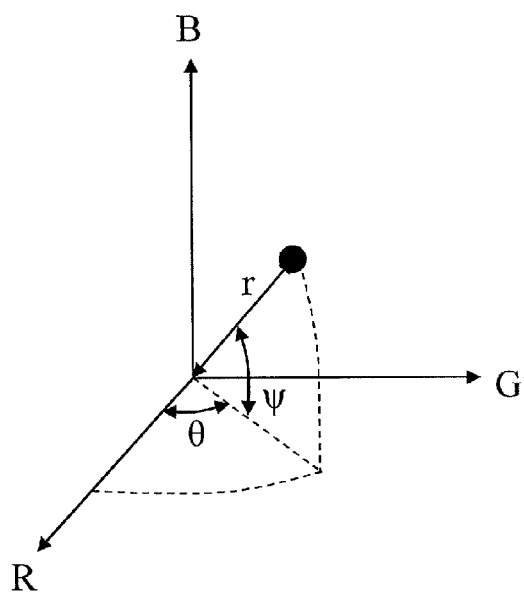
FIG. 6 is a diagram showing an example of how an RGB color space and a spherical coordinate system (θ,ψ,r) correspond to each other.

FIG. 6 shows an example of how an RGB color space corresponds to a spherical coordinate system $(\theta,\psi,r)$.

In FIG. 6, as an example, a direction where $\theta=0°$ and $\psi=0°$ is defined as the positive direction of the R axis of the RGB color space, and a direction where $\theta=90°$ and $\psi=0°$ is defined as the positive direction of the G axis of the RGB color space. Herein, the reference directions of the arguments are not limited to the directions shown in FIG. 6, but may be other directions. Based on such correspondence, pixel values of red, green and blue which are coordinate values in the RGB color space are converted to coordinate values in the spherical coordinate system $(\theta,\psi,r)$ for each pixel.

Where a pixel value of each pixel of the target image is taken as a three-dimensional vector in the RGB color space, if the three-dimensional vector is represented by a spherical coordinate system $(\theta,\psi,r)$ that can be associated with an RGB color space, the brightness (synonymous with "signal intensity" and "luminance") of a pixel is equivalent to the coordinate values of the r axis representing the magnitude of the vector. The direction of the vector representing the color (the color information including the hue, the color difference, the chroma, etc.) of the pixel is defined by the coordinate values of the $\theta$ axis and the $\psi$ axis. Thus, by using the spherical coordinate system $(\theta,\psi,r)$, it is possible to individually handle three parameters of r, $\theta$ and $\psi$ which define the brightness and the color of the pixel.

Expression 40 defines the sum of squares of the second-order difference value in the xy spatial direction of pixel values expressed in the spherical coordinate system of the target image. Expression 40 defines the condition $Q_{s1}$ whose value is smaller as the change in pixel values, expressed in the spherical coordinate system, of pixels that are spatially adjacent to each other in the target image is more uniform. The change in pixel values being uniform corresponds to the pixels having continuous colors. When the value of the condition $Q_{s1}$ should be small, it means that the pixels that are spatially adjacent to each other in the target image should have continuous colors.

In an image, a change in the brightness of a pixel and a change in the color of the pixel may occur from physically different events. Therefore, as shown in Expression 40, a desirable image quality is more likely to be obtained by individually setting the condition regarding the continuity of brightness between pixels (the uniformity of change in coordinate values along the r axis) (the third term in brackets of Expression 40), and the condition regarding the continuity of color between pixels (the uniformity of change in coordinate values along the $\theta$ axis and the $\psi$ axis) (the first and second terms in brackets of Expression 40).

Moreover, $\lambda_\theta(x,y)$, $\lambda_\psi(x,y)$ and $\lambda_r(x,y)$ are weights to be applied, at the pixel position $(x,y)$ in the target image, to conditions that are set by using coordinate values along the $\theta$ axis, the $\psi$ axis and the r axis, respectively. These values are determined in advance. They may simply be set, regardless of the pixel position or the frame, e.g., $\lambda_\theta(x,y)=\lambda_\psi(x,y)=1.0$ and $\lambda_r(x,y)=0.01$. Preferably, the weights may be set to be smaller at positions where discontinuities of pixel values in the image are expected. The discontinuity of pixel values may be determined based on whether the difference value, or the absolute value of the second-order difference value, between pixel values of pixels adjacent to each other in a frame image of an input image is greater than or equal to a certain value.

It is preferred that the weight to be applied to the condition regarding the continuity of color between pixels is set to be larger than the weight to be applied to the condition regarding the continuity of brightness between pixels. This is because the brightness of a pixel in an image changes more easily (has a lower uniformity of change) than the color thereof when the direction of the subject surface (the direction of the normal) changes due to irregularities on the subject surface or the movement thereof.

Note that while the sum of squares of the second-order difference value in the xy spatial direction of pixel values expressed in the spherical coordinate system of the target image is set as the condition $Q_{s1}$ in Expression 40, the sum of absolute values of the second-order difference value, or the sum of squares of the first-order difference value or the sum of absolute values thereof may be set as the condition.

Although the color space condition is set by using a spherical coordinate system $(\lambda,\psi,r)$ that can be associated with an RGB color space in the description above, the coordinate system to be used is not limited to a spherical coordinate system, and advantages similar to those described above can be obtained by setting the condition with a new rectangular coordinate system having such coordinate axes that the brightness and the color of pixels can easily be separated from each other.

For example, the frequency distribution in an RGB color space of pixel values included in an input video image or another subject video image may be determined by a principal component analysis to thereby determine directions of eigenvectors, and coordinate axes of a new rectangular coordinate system may be defined in the directions of the determined eigenvectors (defined as eigenvector axes).

[Expression 41]

$$Q_{s2} = \sum_x \sum_y \begin{bmatrix} \lambda_{C1}(x,y) \cdot \{4 \cdot C_1(x,y) - C_1(x,y-1) - C_1(x,y+1) - C_1(x-1,y) - C_1(x+1,y)\}^2 + \\ \lambda_{C2}(x,y) \cdot \{4 \cdot C_2(x,y) - C_2(x,y-1) - C_2(x,y+1) - C_2(x-1,y) - C_2(x+1,y)\}^2 + \\ \lambda_{C3}(x,y) \cdot \{4 \cdot C_3(x,y) - C_3(x,y-1) - C_3(x,y+1) - C_3(x-1,y) - C_3(x+1,y)\}^2 \end{bmatrix}$$

In Expression 41, $C_1(x,y)$, $C_2(x,y)$ and $C_3(x,y)$ are rotational conversions by which coordinate values in an RGB color space which are pixel values of red, green and blue at the pixel position $(x,y)$ on the target image are converted to coordinate values along coordinate axes $C_1$, $C_2$ and $C_3$ of a new rectangular coordinate system.

Expression 41 defines the sum of squares of the second-order difference value in the xy spatial direction of pixel values expressed in the new rectangular coordinate system of the target image. Expression 41 defines the condition $Q_{s2}$ whose value is smaller as the change in pixel values, expressed in the new rectangular coordinate system, of pixels that are spatially adjacent to each other in each frame image of the target image is more uniform (i.e., as the pixel values are more continuous).

When the value of the condition $Q_{s2}$ should be small, it means that the pixels that are spatially adjacent to each other in the target image should have continuous colors.

Moreover, $\lambda_{C1}(x,y)$, $\lambda_{C2}(x,y)$ and $\lambda_{C3}(x,y)$ are weights to be applied, at the pixel position $(x,y)$ on the target image, to conditions that are set by using coordinate values along the $C_1$ axis, the $C_2$ axis and the $C_3$ axis, respectively, and are determined in advance.

Where the $C_1$ axis, the $C_2$ axis and the $C_3$ axis are eigenvector axes, there is an advantage that one can set suitable values $\lambda$ based on variance values that are different between eigenvector axes by individually setting values of $\lambda_{C1}(x,y)$, $\lambda_{C2}(x,y)$ and $\lambda_{C3}(x,y)$ along the respective eigenvector axes. That is, the value $\lambda$ is set to be larger in a direction of a non-principal component because in the direction, the variance is smaller and the sum of squares of the second-order difference is expected to be smaller. Conversely, the value λ is set to be smaller in a direction of a principal component.

An example with two different conditions $Q_{s1}$ and $Q_{s2}$ has been described above. The condition $Q_s$ may be either $Q_{s1}$ or $Q_{s2}$.

For example, where the condition $Q_{s1}$ shown in Expression 40 is used, if the spherical coordinate system (λ,ψ,r) is introduced, it is possible to set the condition by individually using the coordinate values along the θ axis and the ψ axis representing the color information and the coordinate value along the r axis representing the signal intensity, and also to apply a suitable weight parameter λ for each of the color information and the signal intensity when setting the condition, thus realizing an advantage that it is made easy to produce a high-quality image.

$G_H$ and $B_H$ of the target image are all assumed to be zero, or may be obtained by an iterative-type optimization method such as an optimal gradient method.

$$\frac{\partial J}{\partial R_H(x,y)} = \frac{\partial J}{\partial G_H(x,y)} = \frac{\partial J}{\partial B_H(x,y)} = 0 \quad \text{[Expression 42]}$$

Note that while the present embodiment has been described assuming that the color images to be output are R, G and B, color images other than RGB, such as Y, Pb, Pr, for example, can be output, needless to say. That is, from Expression 42 above and Expression 43 below, a variable conversion shown in Expression 44 can be performed.

[Expression 43]

$$\begin{pmatrix} R \\ G \\ B \end{pmatrix} = \begin{pmatrix} 1 & -0.00015 & 1.574765 \\ 1 & -0.18728 & -0.46812 \\ 1 & 1.85561 & 0.000106 \end{pmatrix} \begin{pmatrix} Y \\ Pb \\ Pr \end{pmatrix}$$

[Expression 44]

$$\begin{pmatrix} \frac{\partial J}{\partial Y_H(x,y)} \\ \frac{\partial J}{\partial Pb_H(x,y)} \\ \frac{\partial J}{\partial Pr_H(x,y)} \end{pmatrix} = \begin{pmatrix} \frac{\partial J}{\partial R_H(x,y)}\frac{\partial R_H(x,y)}{\partial Y_H(x,y)} + \frac{\partial J}{\partial G_H(x,y)}\frac{\partial G_H(x,y)}{\partial Y_H(x,y)} + \frac{\partial J}{\partial B_H(x,y)}\frac{\partial B_H(x,y)}{\partial Y_H(x,y)} \\ \frac{\partial J}{\partial R_H(x,y)}\frac{\partial R_H(x,y)}{\partial Pb_H(x,y)} + \frac{\partial J}{\partial G_H(x,y)}\frac{\partial G_H(x,y)}{\partial Pb_H(x,y)} + \frac{\partial J}{\partial B_H(x,y)}\frac{\partial B_H(x,y)}{\partial Pb_H(x,y)} \\ \frac{\partial J}{\partial R_H(x,y)}\frac{\partial R_H(x,y)}{\partial Pr_H(x,y)} + \frac{\partial J}{\partial G_H(x,y)}\frac{\partial G_H(x,y)}{\partial Pr_H(x,y)} + \frac{\partial J}{\partial B_H(x,y)}\frac{\partial B_H(x,y)}{\partial Pr_H(x,y)} \end{pmatrix}$$

$$= \begin{pmatrix} 1 & 1 & 1 \\ -0.00015 & -0.18728 & 1.85561 \\ 1.574765 & -0.46812 & 0.000106 \end{pmatrix} \begin{pmatrix} \frac{\partial J}{\partial R_H(x,y)} \\ \frac{\partial J}{\partial G_H(x,y)} \\ \frac{\partial J}{\partial B_H(x,y)} \end{pmatrix} = 0$$

Where the condition $Q_{s2}$ shown in Expression 41 is used, since the condition is set with coordinate values in the new rectangular coordinate system, which are obtained by a linear (rotational) conversion of coordinate values in the RGB color space, there is an advantage that the arithmetic operations are simplified.

Moreover, using eigenvector axes as the coordinate axes $C_1$, $C_2$ and $C_3$ of the new rectangular coordinate system, it is possible to set the condition by using coordinate values along an eigenvector axis that reflects the change of a color by which more pixels are influenced. Therefore, an improvement to the image quality of the obtained target image can be expected as compared with a case where the condition is set by simply using pixel values of the red, green and blue components.

Note that the evaluation function J is not limited to the one described above, and a term of Expression 36 may be replaced with a term of a similar expression, or a new term representing a different condition may be added thereto.

Next, the different color images $R_H$, $G_H$ and $B_H$ of the target image are produced by determining the pixel values of the target image such that the value of the evaluation function J of Expression 36 is as small as possible (preferably minimized). For example, a target image g that minimizes the evaluation function J may be obtained by solving the equation of Expression 42 where terms obtained by differentiating J with pixel value components of the different color images $R_H$, Moreover, considering the fact that Pb and Pr have half the number of pixels in the horizontal direction as compared with Y, it is possible to assume simultaneous equations in $Y_H$, $Pb_L$ and $Pr_L$ by utilizing the relationship of Expression 45 below.

$Pb_L(x+0.5)=0.5(Pb_H(x)+Pb_H(x+1))$ $Pr_L(x+0.5)=0.5(Pr_H(x)+Pr_H(x+1))$ [Expression 45]

In this case, the total number of variables to be solved by simultaneous equations can be reduced to ⅔ of that in the case of RGB, thus reducing the computational load.

As described above, according to the present embodiment, a single imager is provided with a temporal addition function and a spatial addition function, and a restoring process is performed on an input image which has been subjected to a temporal addition or a spatial addition for each pixel, whereby it is possible to estimate and restore an image with a high resolution and a high frame rate (an image obtained by reading out all pixels without performing a spatial addition and a temporal addition) while ensuring a sufficient amount of light when recording the image.

Embodiment 2

Embodiment 1 is directed to a case where the number of pixels to be added spatially for R and B and the number of pixels to be added temporally for G are predetermined. The present embodiment is directed to a case where these numbers of pixels added are controlled according to the amount of light.

Figure 7:
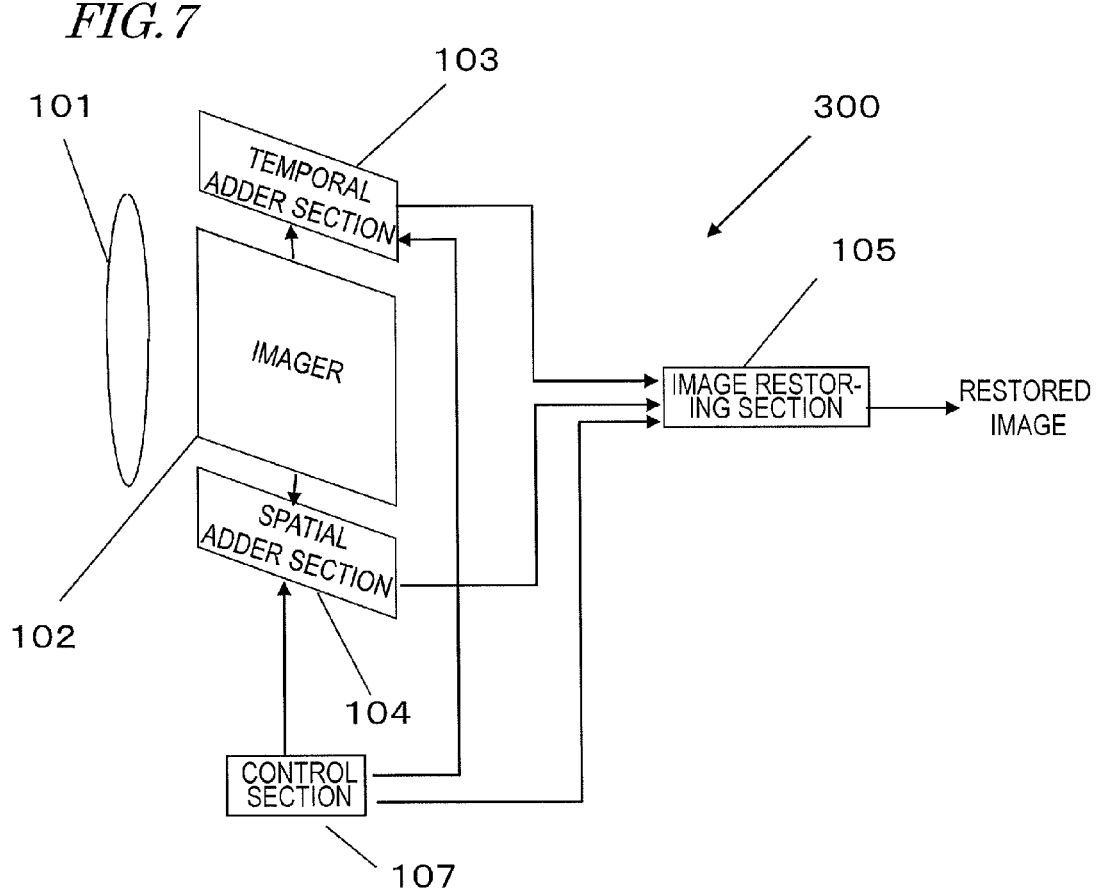
FIG. 7 is a diagram showing a configuration of an imaging and processing device 300 of Embodiment 2.

FIG. 7 is a diagram showing a configuration of the imaging and processing device 300 of the present embodiment. In FIG. 7, components performing like operations to those of FIG. 1 are denoted by like reference numerals to those of FIG. 1, and will not be described below. The operation of a control section 107 will now be described.

The control section 107 changes the number of pixels added by the temporal adder section 103 and the number of pixels added by the spatial adder section 104 according to the amount of light. The amount of light can be detected by observing the overall average of signals read out from the imager, the average thereof for each color, the signal after the temporal addition or the spatial addition, or the luminance level of the image restored by the image restoring section 105, or a sensor may be provided separately. If the amount of light is sufficient (half the saturation level or more), all pixels are read out from a frame without performing the addition operations. When the amount of light becomes insufficient, as it decreases to ½, ⅓, ¼, ⅙ and ⅑ the saturation level, the control section 107 switches the number of frames to be added temporally and the number of pixels to be added spatially by the temporal adder section 103 and the spatial adder section 104 to 2, 3, 4, 6 and 9, respectively.

Thus, it is possible to switch the addition operation according to the amount of light incident upon the camera, and to seamlessly perform processes according to amounts of light, ranging from a small amount of light to a large amount of light, thereby widening the dynamic range and enabling capture of an image while avoiding the saturation.

Note that it is understood that the control of the number of pixels to be added is not limited to a control over the entire image, but may be switched adaptively from one to another for different positions or different areas.

Note that as is clear from the above description, the control section 107 may be operated so as to switch the addition operation from one to another based on the pixel value, instead of the amount of light. Alternatively, the addition operation may be switched from one to another in response to the user's instruction to change the mode of operation.

Embodiment 3

Embodiments 1 and 2 are mainly directed to cases where an image is captured by using a color filter array of a Bayer arrangement. The present embodiment is directed to an example of an imager using a different type of a color filter array.

Figure 8:
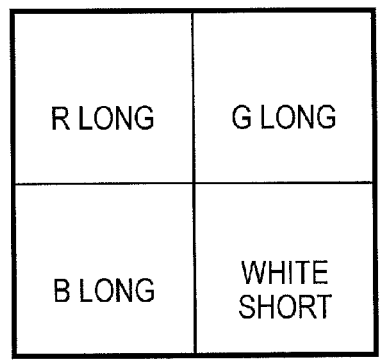
FIG. 8 is a diagram showing an example of a configuration of an imager with such an arrangement and exposure time that R, G and B are exposed for a longer period of time, and white is exposed for a shorter period of time.

FIG. 8 shows an example of a configuration of an imager with such an arrangement and exposure time that R, G and B are exposed for a longer period of time, and white is exposed for a shorter period of time. Note that for the sake of illustration, FIG. 8 only shows the minimal unit of 2×2 pixels.

Herein, a "white" color filter refers to the absence of a color filter, or a transparent filter that passes visible light while blocking infrared light and ultraviolet light.

Figure 9:
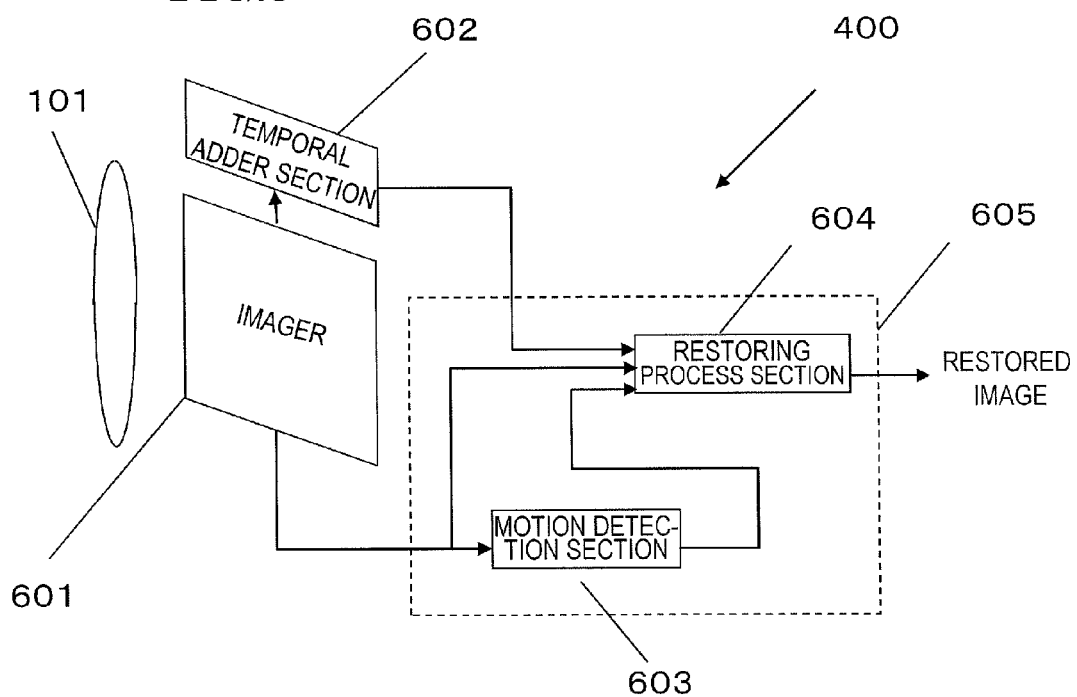
FIG. 9 is a block diagram showing a configuration of an imaging and processing device 400 of Embodiment 3.

FIG. 9 is a block diagram showing a configuration of an imaging and processing device 400 of the present embodiment. The imaging and processing device 400 includes an imager 601, a temporal adder section 602, a motion detection section 603, and a restoring process section 604.

The imager 601, with a color filter array of R, G, B and white attached thereto as shown in FIG. 8, records an image with an accumulation time that accounts for one normal frame.

The temporal adder section 602 adds R, G and B pixel values in the temporal direction over three frames, for example. Note that if the exposure time can be changed for each pixel in the imager 601, the addition/accumulation over three frames may be performed in the pixel section while omitting the temporal adder section 602.

The motion detection section 603 detects the motion information from the white information obtained in a short exposure. A specific method of motion detection is similar to that for R and B in Embodiment 1.

The restoring process section 604 receives the motion information detected by the motion detection section 603, the R, G and B images which have been subjected to a temporal addition by the temporal adder section 602, and a white image captured by the imager 601 so as to restore and output R, G and B pixel values of each pixel of each frame.

As described above, according to the present embodiment, a single imager is provided with a temporal addition function, and a restoring process is performed on an input image which has been subjected to a temporal addition or a spatial addition for each pixel, thereby estimating and restoring an image with a high resolution and a high frame rate (an image obtained by reading out all pixels without performing a spatial addition and a temporal addition) while ensuring a sufficient amount of light when recording the image.

Note that while the present embodiment is directed to a case where a spatial addition is not performed on white pixels, a spatial addition may be performed on white pixels.

Figure 10:
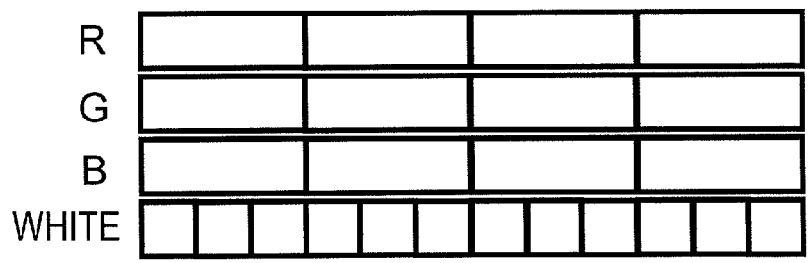
FIG. 10 is a diagram showing an example where the exposure start and end timings for R, G and B, which are exposed for a longer period of time, are aligned with one another.
Figure 11:
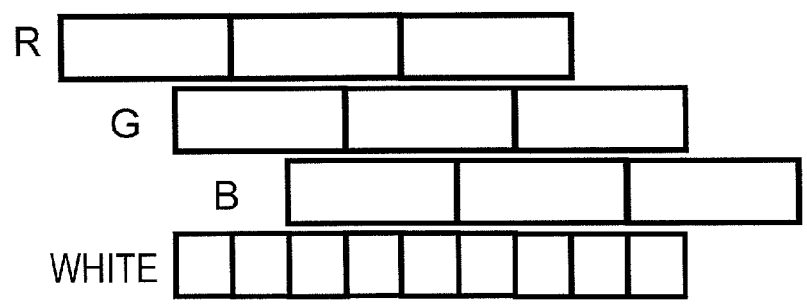
FIG. 11 is a diagram showing an example where the exposure start and end timings for R, G and B, which are exposed for a longer period of time, are shifted from one another.

Note that while the exposure start and end timings of the long exposures of R, G and B may be aligned with one another as shown in FIG. 10, the present invention is not limited to this. For example, the start and end timings may be shifted from one another as shown in FIG. 11. In such a case, the sampling periods of R, G and B being shifted from one another leads to an improvement to the temporal resolution.

Figure 12:
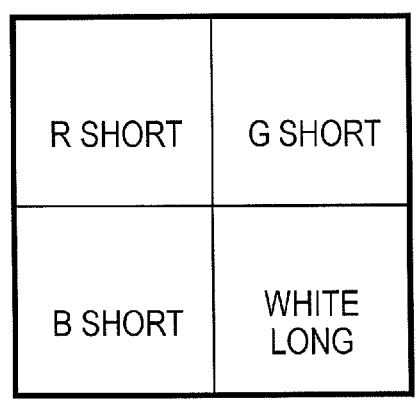
FIG. 12 is a diagram showing another example of the combination of the color filter array and the exposure time.

Note that the combination of the color filter array and the exposure time is not limited to that of the present embodiment shown in FIG. 8, and similar advantages can be obtained by an alternative embodiment included in the present invention in which a combination shown in FIG. 12 is employed and a spatial addition is performed on R, G and B pixels.

Note that Embodiments 1 to 3 are directed to cases where a primary color-type RGB filter is used as a color filter array used for recording an image, but the color filter array is not limited to this. A complementary color-type CMY (cyan, magenta, yellow) filter may be used. The use of a CMY filter is about twice as advantageous in terms of the amount of light although it falls short of an RGB filter in terms of the color reproducibility.

Note that in each of the embodiments above, it is clearly understood that the process can preferably handle a wide color range as the range of pixel values obtained by using different color filters, a temporal addition and a spatial addition (pixel values after the temporal addition and the spatial addition, i.e., corresponding to the amount of light). For example, in Embodiments 1 and 2, a temporal addition is performed over two frames when the spatial addition is performed over two pixels, and a temporal addition is performed over four frames when a spatial addition is performed over four pixels. Thus, it is preferred that the number of frames over which a temporal addition is to be performed, etc., are made uniform in advance, for example. In Embodiment 3, by performing a temporal addition over three frames for R, G and B, the amount of light can be made roughly uniform with that of white pixels.

On the other hand, as a special example, where the color of the subject is unevenly distributed toward a particular color, if a primary color-type filter is used, for example, it is possible to effectively use the dynamic range for each color by adaptively changing the number of pixels for the temporal addition and the spatial addition between R, G and B.

<Description of Spectral Characteristics of Filter>

Figure 13A:
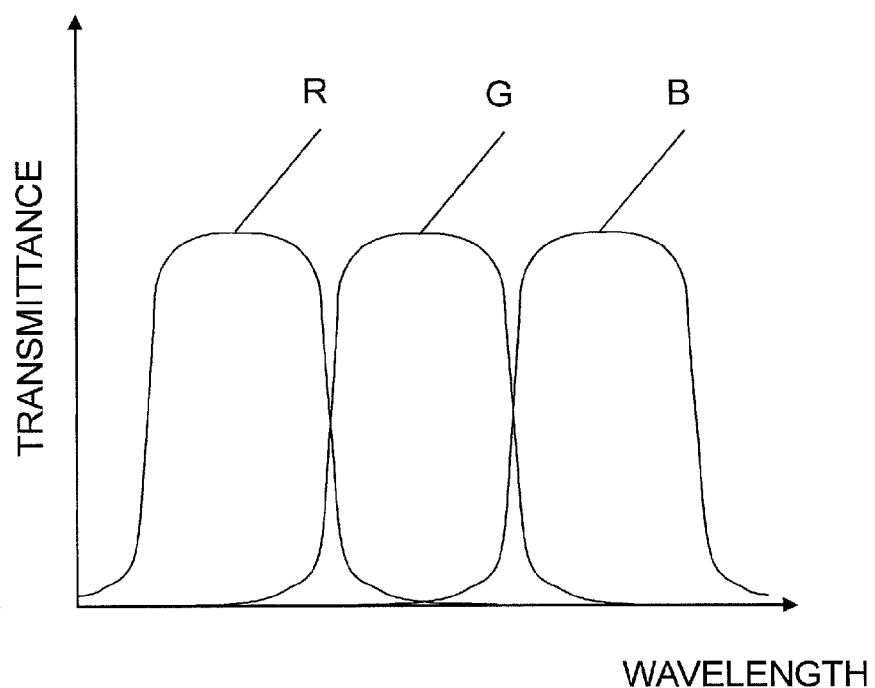
FIG. 13A is a graph showing the spectral characteristics of a thin-film optical filter used with three imagers.
Figure 13B:
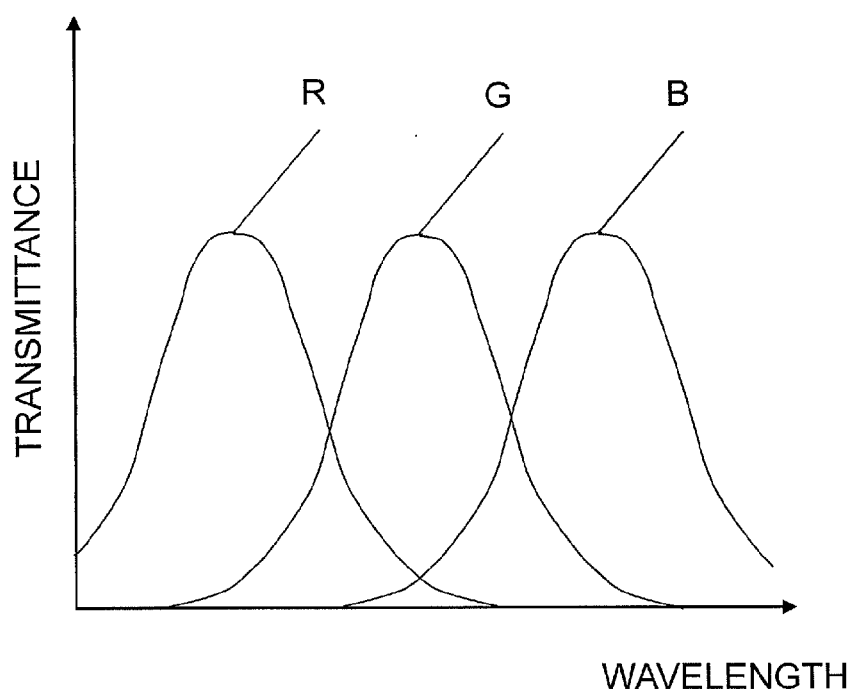
FIG. 13B is a graph showing the spectral characteristics of a dye filter used with a single imager application.

Note that while the embodiments of the present invention are directed to cases where a single imager is used, a thin-film optical filter used with three imagers and a dye filter used with a single imager application have different spectral characteristics as shown in FIGS. 13A and 13B. A thin-film optical filter has a steeper rise in the spectral characteristic, i.e., the transmittance, as compared with that of a dye filter, and has less overlap in transmittance between R, G and B. In contrast, a dye filter has a less steep rise in the transmittance as compared with that of a thin-film optical filter, and has more overlap in transmittance between R, G and B.

In each embodiment of the present invention, a temporally-added image of G is decomposed temporally and spatially by using the motion information detected from the R and B images, and it is therefore more preferred for the process of G that the information of G is contained in R and B, as is the case with a dye filter.

<Correction of Focal Plane Phenomenon>

Figure 14A:
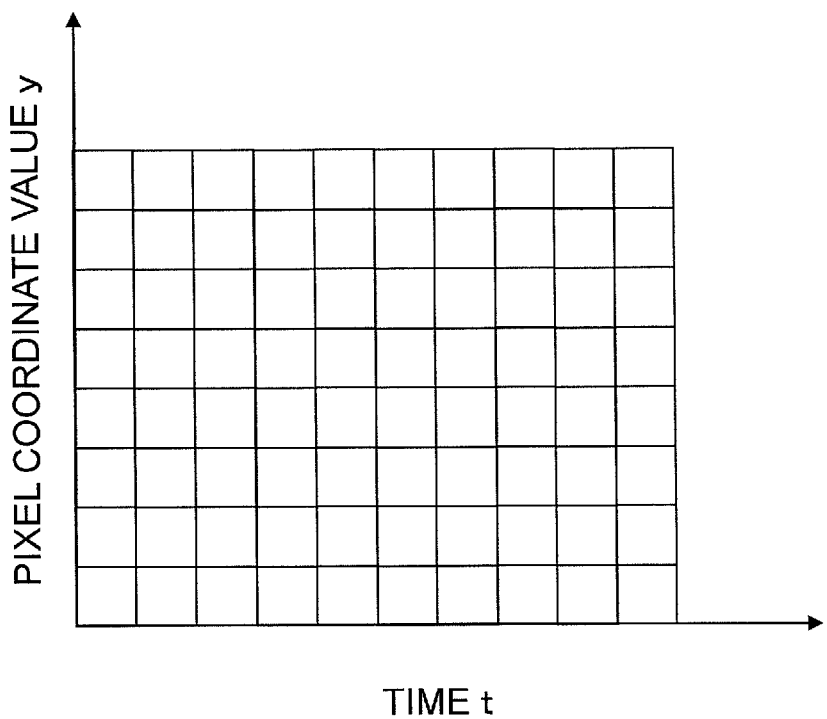
FIG. 14A is a graph showing the exposure timing using a global shutter

Note that in any of the embodiments above, it is assumed that the exposure start time and the end time are identical for each pixel of each color in a 1-frame image (i.e., an image-recording operation using what is known as a "global shutter"). For example, FIG. 14A shows exposure timing using a global shutter.

Figure 14B:
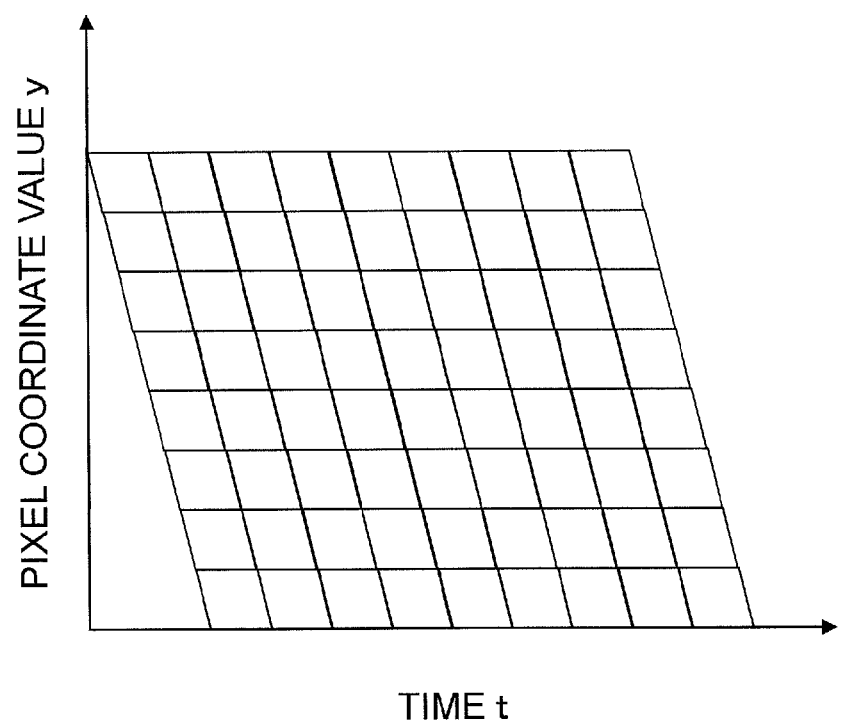
FIG. 14B is a graph showing the exposure timing when a focal plane phenomenon occurs.

However, applications of the present invention are not limited to this. For example, even with a focal plane phenomenon as shown in FIG. 14B, which is often seen as a problem when recording an image with a CMOS imager, it is possible to restore an image captured by using a global shutter by formulating the exposure timings of different elements being different from one another.

In the embodiments above, it is assumed that the imaging and processing device may have various configurations shown in the figures. For example, the image restoring section 105 (FIG. 1, FIG. 2), etc., are described as functional blocks. These functional blocks may each be implemented by hardware using a single semiconductor chip or IC such as a digital signal processor (DSP), or may each be implemented by a computer and software (a computer program), for example. The computer (processor) may be provided in the imaging and processing device, for example, and at least one of the operations of the temporal adder section 103, the spatial adder section 104 and the image restoring section 105 can be implemented by executing a computer program, for example.

The imaging and processing device of the present invention is useful for recording a high-resolution image under a small amount of light or for recording an image with small-sized pixels. The process sections are not limited to hardware implementation, but may alternatively be implemented as programs.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An imaging and processing device comprising:
   an optical element;
   a single imager with a color filter array of a plurality of colors attached thereto for outputting a value according to an amount of light which has been guided by the optical element and transmitted through the color filter array, thereby enabling to obtain separate images of the plurality of colors for every frame time point;
   a first adder section for adding together values, associated with a first color of the plurality of colors, of different images obtained over a plurality of frame time points;
   a second adder section for adding together a plurality of values, associated with a second color of the plurality of colors other than the first color, of an image captured at a single frame time point; and
   an image restoring section for restoring an image including a plurality of colors at each frame time point from an image based on the first color which has been subjected to the addition by the first adder section, and an image based on the second color which has been subjected to the addition by the second adder section.

2. The imaging and processing device according to claim 1, wherein:
   the color filter array includes, as one of the plurality of colors, a third color which is different from the first color and the second color;
   the second adder section adds together a plurality of values, associated with the third color, of an image captured at the single frame time point; and
   the image restoring section includes:
      a motion detection section for detecting a motion from an image of the second color and an image of the third color which have been subjected to the addition by the second adder section so as to output motion information regarding the detected motion; and
      a restoring section for restoring an image including a plurality of colors at each frame time point based on the image of the first color, the image of the second color, the image of the third color, and the motion information detected by the motion detection section.

3. The imaging and processing device according to claim 1, further comprising a control section for controlling an operation of the second adder section and an operation of the first adder section,
   wherein the control section controls the number of pixels to be added together by the second adder section and the first adder section according to one of:
      an amount of light or a pixel value received by the single imager: and
      a mode of operation specified by a user.

4. The imaging and processing device according to claim 1, wherein the single imager is of a stacked type.

5. The imaging and processing device according to claim 2, wherein the single imager is of a stacked type.

6. The imaging and processing device according to claim 3, wherein the single imager is of a stacked type.

7. The imaging and processing device according to claim 2, wherein the first color is green, and the second color and the third color are red and blue.

8. An imaging and processing device comprising:
   a single imager with a color filter array of red, green, blue and white attached thereto for outputting a value according to an amount of light which has been transmitted through the color filter array, thereby enabling to obtain an image for each color of the color filter array for every frame time point;

a first adder section for adding together values associated with each of the images of red, green and blue obtained over a plurality of frame time points;

a motion detection section for detecting a motion from the image of white so as to output motion information regarding the detected motion; and an image restoring section for restoring an image including red, green and blue at each frame time point based on the images of red, green and blue which have been subjected to the addition by the first adder section, the image of white, and the motion information.

9. The imaging and processing device according to claim 8, wherein:

the first adder section adds together values associated with each of the images of red, green and blue by setting an exposure time of the single imager to a length that spans a plurality of frame time points; and the first adder section changes the exposure time between red, green and blue.

10. An imaging and processing device comprising:

a single imager with a color filter array of red, green, blue and white attached thereto for outputting a value according to an amount of light which has been transmitted through the color filter array, thereby enabling to obtain an image for each color of the color filter array for every frame time point;

a first adder section for adding together values associated with each of the images of red, green and blue obtained over a plurality of frame time points;

a second adder section for adding together a plurality of values associated with an image of white captured at a single frame time point;

a motion detection section for detecting a motion from the image of white which has been subjected to the addition by the second adder section so as to output motion information regarding the detected motion; and an image restoring section for restoring an image including red, green and blue at each frame time point based on the images of red, green and blue which have been subjected to the addition by the first adder section, the image of white which has been subjected to the addition by the second adder section, and the motion information.

11. The imaging and processing device according to claim 10, wherein:

the first adder section adds together values associated with each of the images of red, green and blue by setting an exposure time of the single imager to a length that spans a plurality of frame time points; and the first adder section changes the exposure time between red, green and blue.

12. A computer program, stored on a non-transitory computer-readable medium, to be executed by a computer provided in an imaging and processing device, the imaging and processing device comprising:

an optical element; and a single imager with a color filter array of a plurality of colors attached thereto for outputting a value according to an amount of light which has been guided by the optical element and transmitted through the color filter array, thereby enabling to obtain separate images of the plurality of colors for every frame time point, the computer program causing the computer to execute the steps of:

adding together values, associated with a first color of the plurality of colors, of different images obtained over a plurality of frame time points;

adding together a plurality of values, associated with a second color of the plurality of colors other than the first color, of an image captured at a single frame time point; and restoring an image including a plurality of colors at each frame time point from an image based on the first color which has been subjected to the addition by the first addition step, and an image based on the second color which has been subjected to the addition by the second addition step.

* * * * *